Figure 1:
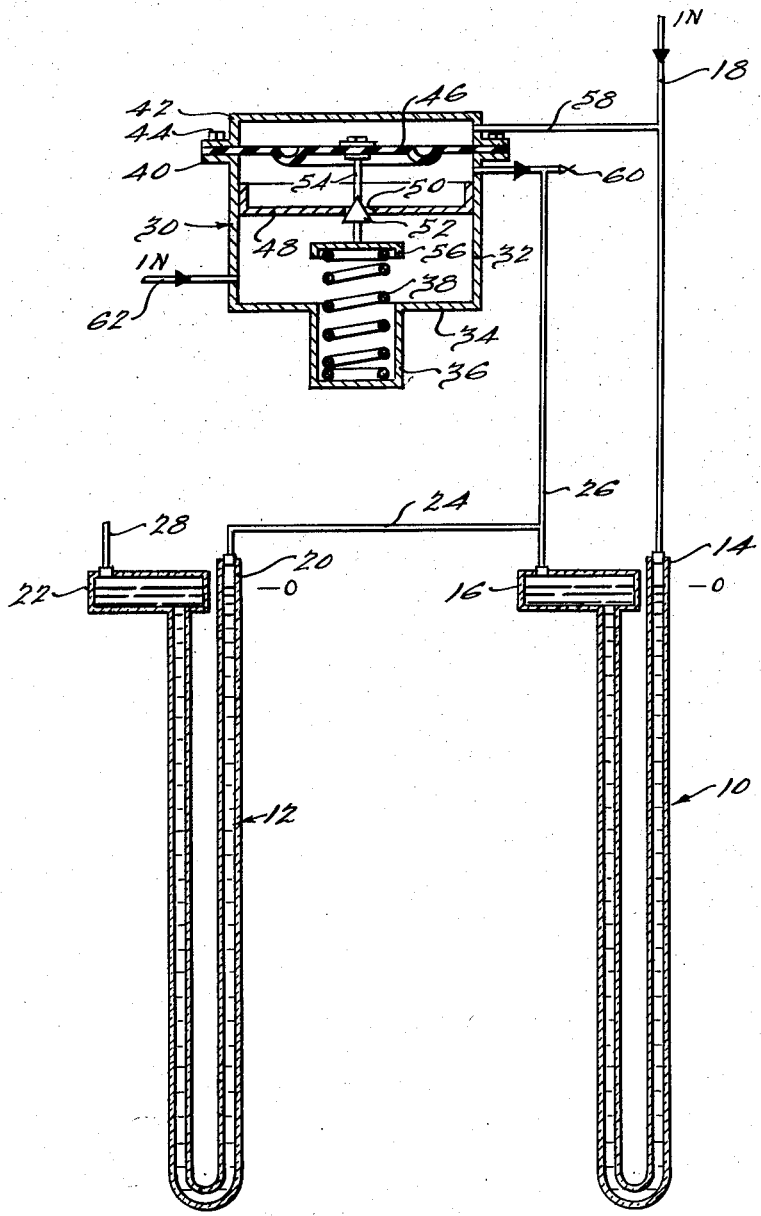

Sept. 2, 1958 W. I. CHAPMAN 2,849,883
PRESSURIZED MANOMETER
Filed April 29, 1955 2 Sheets-Sheet 1

INVENTOR.
William I. Chapman
BY
ATTORNEYS.

Sept. 2, 1958 W. I. CHAPMAN 2,849,883
PRESSURIZED MANOMETER
Filed April 29, 1955 2 Sheets-Sheet 2
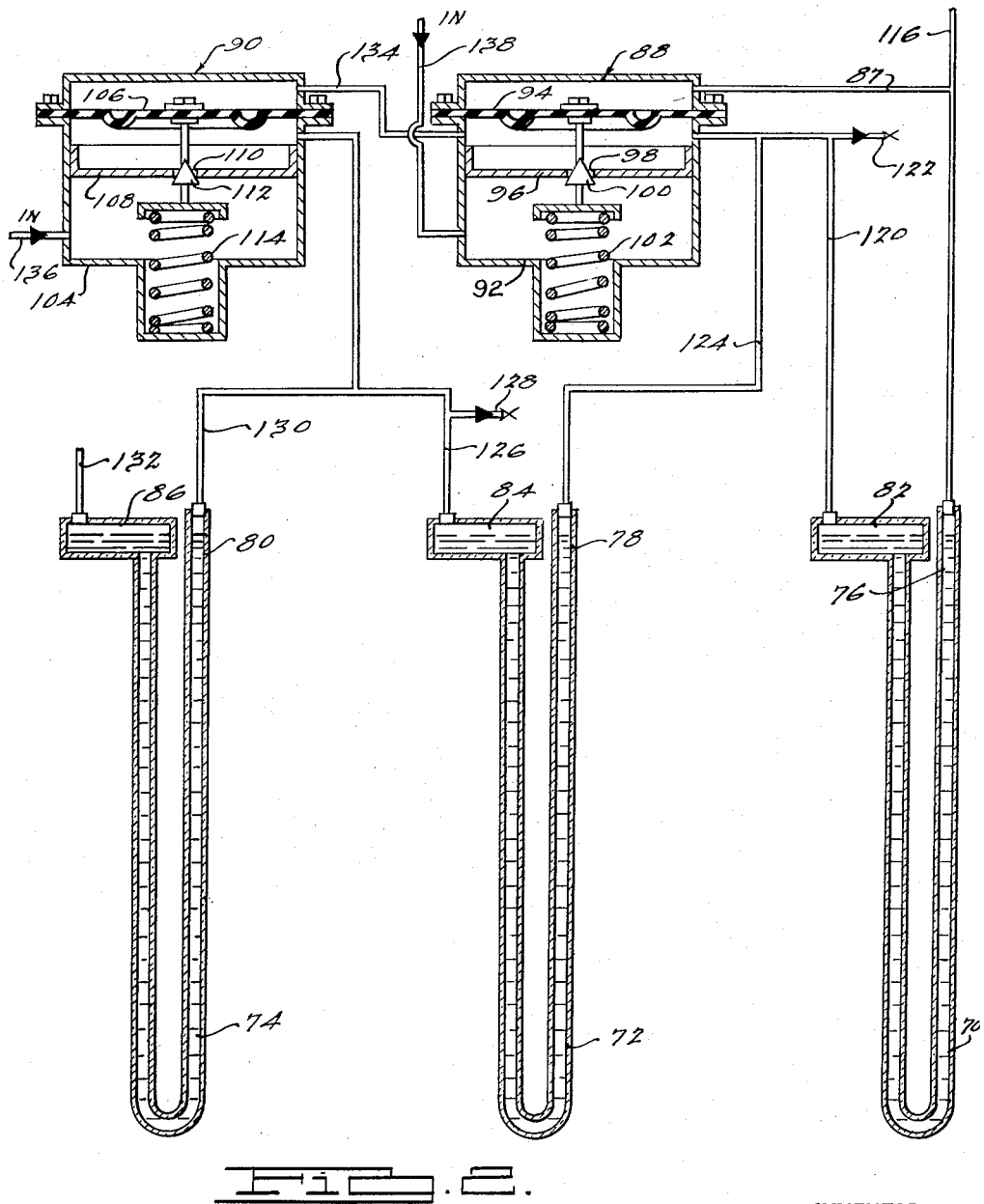
INVENTOR.
William I. Chapman
BY
Harness and Harris
ATTORNEYS United States Patent Office 2,849,883
Patented Sept. 2, 1958

2,849,883

PRESSURIZED MANOMETER

William I. Chapman, Birmingham, Mich., assignor to Chrysler Corporation, Highland Park, Mich., a corporation of Delaware Application April 29, 1955, Serial No. 504,953

9 Claims. (Cl. 73—401)

My invention relates generally to precision pressure measuring instruments and more particularly to a new and improved fluid pressure measuring instrument of the manometer type. The instrument of my instant invention is particularly useful in obtaining direct readings of the high pressures encountered in the testing of gas turbine power plants. However, I contemplate that my invention may also be used in the calibration of conventional high pressure measuring instruments, in measuring pressures obtained in other fluid pressure apparatus and in a variety of other engineering applications of a similar nature.

In general, mercury manometers are characterized by a high degree of accuracy but their usefulness in high pressure test work of the type above mentioned has been somewhat limited since the lengths of the manometer tubes required for measuring high pressure fluids are of an undesirably large magnitude. Because of the inconvenience in reading manometer tubes capable of measuring higher pressures, and because of the inconvenience in installing and in maintaining the same, direct reading manometers are generally limited in use to the measurement of pressure differentials of magnitude less than 30 p. s. i.

I am aware of various systems of known construction for pressurizing a plurality of manometers with a given test pressure or signal and for distributing the signal between the manometers in such a way that separate portions of the total signal may be conveniently read from each manometer, the magnitude of the total signal being equal to the sum of the various readings. Each manometer tube of such a system may thus be made of a convenient length. However, these systems are complex in construction, are expensive to manufacture and are lacking in accuracy. The improved instrument of my instant invention overcomes the disadvantages of these multiple manometer instruments of known construction and it is characterized by a unique principle of operation.

The provision of an improved fluid pressure measuring instrument of the type above mentioned being a principal object of my invention, it is a further object of my invention to provide a fluid pressure measuring device employing two or more manometers wherein means are provided for regulating the distribution of a test pressure signal between the various manometers so that measurements of pressure within a given range of magnitudes may be read directly on a first one of the manometers and measurements of pressure within another range of magnitude may be read directly on a second one of the manometers, the total pressure reading being the sum of the readings obtained with each separate manometer.

It is a further object of my instant invention to provide a fluid pressure measuring device as set forth in the preceding object which is simple in construction, which is inexpensive to make, and which is characterized by a high degree of reliability and accuracy.

It is a further object of my instant invention to provide a fluid pressure measuring device of the manometer type which may be readily adapted to be used with a variety of different test installations.

It is a further object of my instant invention to provide a reliable fluid pressure regulator device of simplified construction for use with a multiple manometer fluid pressure measuring instrument, said regulator being capable of automatically distributing the test pressure signal among the various tubes so that each of the individual manometers may be reduced to a convenient length.

It is a further object of my instant invention to provide a pressure regulator device as set forth in the preceding object which is capable of limiting the pressure applied to each of the manometers to a predetermined amount, one manometer being subjected only to pressures within a low range of values and another manometer being subjected only to pressures within another range of values.

Other objects and advantages of my instant invention will readily become apparent from the following description and from the accompanying drawings wherein:

Figure 1 is a schematic representation of the pressure measuring instrument of my instant invention showing a pair of manometer tubes and a pressure regulator device for distributing the test pressure signal between each of the manometers; and Figure 2 shows a pressure measuring instrument of the type illustrated in Figure 1 wherein a third manometer tube may be employed for measuring pressures within a higher range of magnitude. This instrument includes a pair of pressure regulator devices arranged in series for selectively distributing pressures of various magnitude to each of the three manometer tubes.

Referring first to the schematic view of Figure 1, the first manometer tube is generally designated by numeral 10, and a second manometer tube is generally designated by numeral 12. The manometer 10 includes a high pressure side 14 and a low pressure reservoir chamber 16. By preference the manometer should be filled with mercury since the specific gravity of mercury is such that the total length of the tubes may be reduced as much as possible.

A test pressure signal may be applied to a pressure line 18 and it may be transmitted to the high pressure side 14 of the manometer 10, the line 18 communicating with high pressure side 14 as indicated. The manometer 12 also includes a high pressure side 20 and a low pressure reservoir portion 22, the former communicating with the low pressure reservoir 16 of the manometer 10 through a passage 24 and a portion of another passage 26. The low pressure reservoir portion 22 of the manometer 12 is vented to the ambient air as shown at 28. Manometer 12 may also be filled with mercury. Each of the manometers 10 and 12 may be mounted on a mounting board or the like upon which suitable graduations may be provided.

I have generally designated the pressure regulator device by numeral 30 and it may include a housing 32 having a lower wall 34, the latter being recessed as shown at 36 to receive a compression spring 38. The housing 32 may be axially flanged, as shown at 40, and a cap member 42 may be bolted to the flange 40 by suitable bolts 44 or by any other suitable fastening means. A flexible diaphragm 46 is transversely disposed across the housing portion 32 and is secured about its periphery between the flange 40 and the cap member 42. A transverse partition 48 is situated within the housing 32 and is permanently secured to the interior wall thereof in the position shown. Partition 48 is provided with a central orifice 50 and a valve element 52 is adapted to progressively restrict the orifice 50 as it is moved into registry therewith. The valve element 52 may be centrally secured to the diaphragm 46 by means of a positive connecting link 54. A spring seat 56 is joined to the valve element 52 and is seated on compression spring 38. If desired, the valve element 52 may merely abut the diaphragm 46 with no positive connection therewith, the spring 38 being effective to urge the valve element 52 into contact with diaphragm 46.

A branch passage 58 interconnects the passage 18 with the chamber above the flexible diaphragm 46 within the presssure regulator 30 for the purpose of distributing a reference pressure from the source of the pressure signal to the regulating device 30. The previously mentioned passage 26 extends to the chamber defined by the flexible diaphragm 46 and the transverse partition 48 within the regulator 30, and a flow restricting orifice 60 is provided in the passage 26 as indicated. An auxiliary pressure passage 62 communicates with the chamber below the transverse partition 48 within the regulator 30 for the purpose of conducting pressure from a suitable auxiliary pressure source to the regulator 30.

In operation, the spring 38 is effective to urge the valve element 52 in an upward direction, as viewed in Figure 1, to close the orifice 50. As the test pressure within passage 18 increases, the level of the mercury in the manometer 10 provides an indication of the magnitude of the pressure being tested. The restricted orifice 60 functions as a vent to make such a variation in the level of the mercury possible.

Pressure regulator 30 is calibrated so that the diaphragm 46 will become deflected in a downward direction against the biasing force of the spring 38 as the reference pressure in the chamber above the diaphragm 46 reaches a predetermined maximum value. The pressure at which the diaphragm 46 becomes deflected corresponds to the maximum reading which may be obtained with the manometer 10. As the reference pressure increases beyond this predetermined maximum value, the valve element 52 will become unseated thereby opening the orifice 50 to allow the transfer of auxiliary air pressure to the chamber on the lower side of the diaphragm 46. The characteristics of the regulator 30 are such that a given increase in the reference pressure in passage 18 will be accompanied by an equal increase in the pressure below the diaphragm 46. The amount of the increase in the pressure in the chamber below the diaphragm 46 is communicated to the high pressure side of the manometer 12 through passage 24. The reading which is obtained on the manometer 12 is therefore a direct indication of the amount of the increase in the reference pressure 18 above the predetermined value aforementioned. It is therefore apparent that the total test pressure may be measured by adding the reading obtained with manometer 10 and the reading obtained by manometer 12.

If desired, any number of manometers may be arranged in series for the purpose of measuring high gas pressures and more than one pressure regulator may be used in combination with the series connected manometers for the purpose of distributing separate portions of the total pressure to each of the manometers in a manner similar to that above described. By way of illustration, I have shown a device comprising three separate manometers identified by numerals 70, 72, and 74. Each of the manometers shown in Figure 3 may be of similar construction to the manometers 10 and 12 in Figure 1 and they may each include a high pressure portion and a low pressure reservoir portion. The high pressure portion for the manometers 70, 72, and 74 are identified by numerals 76, 78, and 80 respectively, and the low pressure reservoir portions for these same manometers are identified by numerals 82, 84, and 86 respectively. A pair of pressure regulators for the instrument of Figure 3 are identified by numerals 88 and 90, said regulators being similar in construction to the previously described regulator 30. Regulator 88 may include a housing 92, a flexible diaphragm 94, a partition 96, an orifice 98 formed in the partition 96, a valve element 100 operatively connected to the diaphragm 94, and a spring 102 biasing the valve member 100 in an upward direction as viewed in Figure 2. Similarly the regulator 90 comprises a housing 104, a flexible diaphragm 106, a partition 108 formed within the interior of the housing 104, an orifice 110 formed in the partition 108, a valve member 112 carried by the flexible diaphragm 106, and a spring 114 for biasing the valve member 112 into registry with the orifice 110.

A pressure passage 116 extends from a source of test pressure to the high pressure side 76 of the manometer 70. A branch pressure passage 87 extends from passage 116 to the chamber within the regulator 88 above the flexible diaphragm 94. A passage 120 extends from the low pressure reservoir 82 of the manometer 70 to the chamber within the regulator 88 below the flexible diaphragm 94. A flow restricting orifice 122 is formed in the passage 120 as indicated.

Another passage 124 extends from the above mentioned passage 120 to the high pressure side of the manometer 72 and a passage 126 extends from the low pressure reservoir portion 84 of the manometer 72 to the chamber within the regulator 90 below the flexible diaphragm 106. The passage 126 is provided with a flow restricting orifice 128 as indicated. A passage 130 extends from the above mentioned passage 126 to the high pressure side 80 of the manometer 74 and the low pressure reservoir portion 86 of the manometer 74 is vented through a vent passage 132.

The chamber within the reservoir 90 above the diaphragm 106 is connected with the chamber in the reservoir 88 below the diaphragm 94 through a cross passage 134. An auxiliary air pressure passage 136 is adapted to supply the chamber below the partition 108 with auxiliary air pressure and a passage 138 is similarly adapted to supply the chamber within the regulator 88 below the partition 96 with this same auxiliary pressure.

In operation, the passage 116 may be connected to the source of pressure to be tested and pressures up to a first predetermined limit may be read directly on the manometer tube 70, the vent 122 accommodating the air displaced by the liquid mercury within the low pressure reservoir 82. The reference test pressure is conducted to the chamber within the regulator 88 above the flexible diaphragm 94 through the passage 87. The valve element 100 is normally biased into an orifice closing position by the spring 102 and as the reference pressure increases to a value greater than the above-mentioned first predetermined limit, the flexible diaphragm 94 is deflected in a downward direction so as to unseat the valve element 100 and to allow auxiliary pressure from the passage 138 to enter the chamber below the diaphragm 94 through the orifice 98. The resulting increase in pressure in the chamber below the diaphragm 94 is conducted to the low pressure reservoir portion 82 of the manometer 70 so as to balance the increase in reference pressure above the aforementioned first predetermined limit. The restricted orifice 122 is adapted to accommodate a continuous flow of air from the passage 138 and the chamber below the diaphragm 94 and the pressure build-up within the chamber below the diaphragm 94 occurs by reason of the back pressure produced by the orifice 122.

It is therefore apparent that an increase in the reference pressure above the aforementioned first predetermined limit will not cause a variation in the reading of the manometer 70. However, the magnitude of the increase in pressure above this first predetermined limit may be read directly on the manometer 72, the orifice 128 accommodating the air displaced within the low pressure reservoir portion 84 of the manometer 72 during variations in the reading of the latter.

As the reference pressure varies in magnitude from the aforementioned first predetermined limit to a second higher predetermined limit, the magnitude of the total pressure may be determined by adding the readings obtained by the manometers 70 and 72. As the reference pressure increases to a value greater than the second predetermined limit, the pressure within the chamber above the flexible diaphragm 106 of the regulator 90 increases to such a value that the diaphragm 106 is biased in a downward direction, as viewed in Figure 2, thereby moving the valve element 112 to an open position. Auxiliary air pressure is then allowed to pass through the orifice 110 into the passages 126 and 130. The amount of the increase in the reference pressure above the aforementioned second predetermined limit is balanced by the increase in the pressure in the passage 126 so that variations in the reference pressure above the second predetermined limiting value will not be accompanied by corresponding variations in the reading of the manometer 72. However, the amount of the increase in the reference pressure above the second predetermined limiting value may be read directly on the manometer 74 since the pressure buildup in the chamber below the flexible diaphragm 106 of the regulator 90 and the passage 126 is conducted to the high pressure side 80 of the manometer 72 through the passage 130. The low pressure reservoir portion 86 of the manometer 74 is vented, as previously mentioned, at 132 to accommodate variations in the level of the liquid mercury in the low pressure reservoir portion 86.

When the valve element 112 is moved to an open position, auxiliary air is allowed to continuously pass from the chamber below the partition 108 through the orifice 110 into the passage 126 and then out the orifice 128. The pressure buildup which is produced in the chamber below the diaphragm 106 and in the passage 130 occurs by reason of the back pressure produced by the orifice 128 while accommodating this continuous air flow.

It is thus apparent that I have provided a simple manometer type pressure measuring instrument which may be readily adapted to be used with a variety of different test installations. By preference, means may be provided for adjusting the tension of the spring associated with each regulator in order that one regulator might be used with manometer tubes of various lengths.

I have found it convenient to use manameter tubes which are 60 inches or less in length. If the magnitude of the test pressure exceeds 60 inches of mercury, additional tubes may be added as above described. If the test pressure should range from 60 inches of mercury to 120 inches of mercury, two 60-inch tubes would be required. If the test pressure ranges from 120 inches of mercury to 180 inches of mercury, three tubes would be required, and so on. The auxiliary air pressure used with the system may be obtained from any convenient source such as a shop air pressure line.

What I claim and desire to secure by United States Letters Patent is:

1. In a fluid pressure measuring device, a pair of manometer tubes, means for connecting one side of one manometer tube to a test fluid pressure source, means for connecting the other side of said one manometer and one side of the other manometer to a source of auxiliary fluid pressure, said last-named means including a pressure regulator mechanism in communication with said test pressure source and responsive to said test pressure above a predetermined value to regulate the magnitude of the auxiliary fluid pressure transmitted to said tubes.

2. In a fluid measuring device comprising a pair of manometer tubes, one side of one of said tubes being adapted to be connected to a source of test pressure, and conduit means including one portion communicating with a source of auxiliary fluid pressure and other portions communicating with the other side of said one tube and with one side of the other tube; a pressure regulator mechanism comprising a housing, a movable wall partitioning said housing into separate pressure chambers at opposite sides of said wall, a fluid flow restricting orifice forming a part of said one portion of said conduit means, a valve element engaging and movable with said movable wall for progressively varying the effective opening of said orifice, the pressure chamber on one side of said movable wall communicating with said source of test pressure, said other portions of said conduit means communicating with the other pressure chamber on the other side of said wall, and means for bleeding fluid pressure from said other portions.

3. A fluid pressure measuring instrument comprising first and second manometer tubes, each of said tubes having a high pressure side and a low pressure side, a regulator comprising a housing, a movable wall situated within said housing defining separate pressure chambers on either side thereof, passage means for connecting one of said chambers with a source of auxiliary fluid pressure, said passage means including a flow restricting orifice, conduit means for connecting said one chamber to the high pressure side of said first manometer tube and to the low pressure side of said second manometer tube, means for connecting the other of said chambers and the high pressure side of said second manometer tube to a test fluid pressure source, a valve element operatively connected with said movable wall, said valve element registering with said orifice for variably restricting the same upon movement of said movable wall under the influence of fluid pressure differential across the latter, means yieldingly urging said valve element into position closing said orifice, and means for bleeding fluid from said conduit means.

4. A fluid pressure measuring device comprising a plurality of manometer tubes, each of said tubes having a high pressure side and a low pressure side, conduit means for connecting the high pressure side of one manometer tube to a test pressure source and including conduit portions connecting the high pressure side of another tube with the low pressure side of said one tube, and pressure regulator means in communication with said test pressure source and a source of auxiliary fluid pressure and said conduit portions and effective to regulate the auxiliary pressure to said conduit portions as a function of said test pressure.

5. A fluid pressure measuring device comprising a plurality of manometer tubes, each of said tubes having a high pressure side and a low pressure side, conduit means for connecting the high pressure side of one manometer tube to a test pressure source, auxiliary conduit means for connecting an auxiliary fluid pressure source to the low pressure side of said one tube and to the high pressure side of another tube, said auxiliary conduit means including conduit portions connecting the last-named low pressure and high pressure sides, and pressure regulator means responsive to said test pressure and arranged in said auxiliary conduit means to regulate the auxiliary pressure to said conduit portions.

6. The combination according to claim 5 wherein said pressure regulator means includes portions for regulating said auxiliary pressure to said conduit portions as a function of said test pressure when the latter exceeds a predetermined value and includes portions effective to block said auxiliary pressure to said conduit portions when said test pressure is less than said predetermined value.

7. A fluid pressure measuring device comprising a plurality of manometer tubes, each of said tubes having a high pressure side and a low pressure side, conduit means for connecting the high pressure side of one manometer tube to a test pressure source, means for applying an auxiliary pressure to the low pressure side of said one tube and to the high pressure side of another tube, and a pressure regulator responsive to said test pressure and cooperable with the last-named means to regulate the distribution of said auxiliary pressure to the last-named high pressure and low pressure sides as a function of said test pressure.

8. In a fluid measuring device comprising a pair of manometer tubes, means for connecting one side of one of said tubes with a source of test pressure, a pressure regulator mechanism comprising a housing, a pressure actuated movable wall partitioning said housing into separate pressure chambers at opposite sides of said wall, means connecting one pressure chamber on one side of said wall with said source of test pressure, conduit portions connecting the other pressure chamber on the other side of said wall with the other side of said one tube and with one side of the other tube, means for bleeding fluid pressure from said conduit portions, auxiliary conduit means connecting said other pressure chamber with an auxiliary source of fluid pressure, and valve means for controlling the fluid flow from said auxiliary source into said other pressure chamber and having an operating element operable by engagement with said wall.

9. The combination according to claim 7 wherein said valve operating element is effective to increase the fluid flow into said other chamber progressively upon movement of said wall responsive to increasing test pressure above a predetermined value in said one pressure chamber, and in addition comprising means yieldingly urging said operating element into position to shut off said fluid flow into said other chamber when said test pressure is less than said predetermined value.

References Cited in the file of this patent

UNITED STATES PATENTS

| | | |
|---|---|---|
| 2,562,494 | Hejduk | July 31, 1951 |
| 2,584,455 | Hughes | Feb. 5, 1952 |